United States Patent
Bodemer et al.

(10) Patent No.: US 12,491,186 B2
(45) Date of Patent: Dec. 9, 2025

(54) EGFR INHIBITORS FOR TREATING KERATODERMAS

(71) Applicants: INSERM (Institut National de la Santé et de la Recherche Médicale), Paris (FR); Assistance Publique-Hôpitaux de Paris (APHP), Paris (FR); Université de Paris, Paris (FR); Fondation Imagine, Paris (FR); Université Paris-Sud, Orsay (FR)

(72) Inventors: Christine Bodemer, Paris (FR); Céline Greco, Villejuif (FR); Claude Boucheix, Villejuif (FR)

(73) Assignees: INSERM (INSTITUT NATIONAL DE LA SANTÉ ET DE LA RECHERCHE MÉDICALE), Paris (FR); Assistance Publique-Hôpitaux de Paris (APHP), Paris (FR); Université de Paris, Paris (FR); Fondation Imagine, Paris (FR); Université Paris-Sud, Orsay (FR)

( * ) Notice: Subject to any disclaimer, the term of this patent is extended or adjusted under 35 U.S.C. 154(b) by 794 days.

(21) Appl. No.: 17/281,745

(22) PCT Filed: Oct. 3, 2019

(86) PCT No.: PCT/EP2019/076803
§ 371 (c)(1),
(2) Date: Mar. 31, 2021

(87) PCT Pub. No.: WO2020/070239
PCT Pub. Date: Apr. 9, 2020

(65) Prior Publication Data
US 2021/0393632 A1    Dec. 23, 2021

(30) Foreign Application Priority Data
Oct. 4, 2018    (EP) .................................... 18306306

(51) Int. Cl.
*A61K 31/517*    (2006.01)
*A61K 31/4706*    (2006.01)
*A61K 31/506*    (2006.01)
*A61K 31/519*    (2006.01)
*A61K 31/5377*    (2006.01)
*A61K 31/675*    (2006.01)
*A61P 17/12*    (2006.01)

(52) U.S. Cl.
CPC ........ *A61K 31/517* (2013.01); *A61K 31/4706* (2013.01); *A61K 31/506* (2013.01); *A61K 31/519* (2013.01); *A61K 31/5377* (2013.01); *A61K 31/675* (2013.01); *A61P 17/12* (2018.01)

(58) Field of Classification Search
CPC ... A61P 17/12; A61K 31/4706; A61K 31/506; A61K 31/519; A61K 31/5377; A61K 31/675
See application file for complete search history.

(56) References Cited

U.S. PATENT DOCUMENTS 5,747,498 A * 5/1998 Schnur ................ C07D 231/12
514/266.4

FOREIGN PATENT DOCUMENTS

WO    0134574 A1    5/2001
WO    2009091889 A1    7/2009

OTHER PUBLICATIONS

Kenner-Bell et al. Epidermal growth factor receptor inhibition with erlotinib for palmoplantar keratoderma, Journal of America Academy of Dermatology; 2010, 63(2), 58-59 (Year: 2010).*
Shah et al. Clinical Lung Cancer, vol. 21, No. 3, e216-28 (Year: 2019).*
Paller et al. (Hurwitz Clinical Pediatric Dermatology. 2015; 5: 95-118) (Year: 2015).*
Duchatelet et al. (Orphanet J Rare Dis. 2015; 10: 33) (Year: 2015).*
Cheng et al. (Cell. 2010; 141(2): 331-343) (Year: 2010).*
Shah et al. (Clinical Lung Cancer. 2020; 21(3): 216-28) (Year: 2020).*
Akita et al. (Seminars in Oncology, 2003; 30(3): 15-24) (Year: 2003).*
Wilson et al. (The Journal of investigative Dermatology. 2015; 135(11): 2879) (Year: 2015).*
Duchatelet et al. (BBr J Dermatol. 2014; 171(3):675-678) (Year: 2014).*
Oakley et al. (Topical Formulations. DermNet. 2010 (updated 2016) https://dermnetnz.org/topics/topical-formulations#). (Year: 2010).*

(Continued)

*Primary Examiner* — Clinton A Brooks
*Assistant Examiner* — Jerica Katlynn Wilson
(74) *Attorney, Agent, or Firm* — WCF IP

(57) ABSTRACT

Olmsted syndrome (OS) is a rare genodermatosis classically characterized by the combination of bilateral mutilating transgredient palmoplantar keratoderma (PPK) and periorificial keratotic plaques. The inventors obtained remarkable results with a treatment with a EGFR inhibitor (e.g. erlotinib) in 3 patients with Olmsted Syndrome and erythemalgia linked to different TRPV3 mutations. In less than 3 months, the drug induced a complete disappearance of the hyperkeratosis and the pain. Anorexia and insomnia disappeared with an improvement of the growth. Accordingly, the present invention relates to the use of EGFR inhibitors for the keratodermas.

11 Claims, No Drawings
Specification includes a Sequence Listing.

(56) References Cited

OTHER PUBLICATIONS

Wilson, NJ, et al., "Expanding the Phenotypic Spectrum of Olmstead Syndrome", Journal of Investigative Dermatology 135, Jul. 23, 2015.
Cheng, X et al., "TRP Channel regulates EGFR signaling in Hair Morphogenesis and Skin Barrier Formation", Cell vol. 141 No. 2, Apr. 16, 2010.
Moyer, J et al., "Induction of Apoptosis and Cell Cycle Arrest by CP-358,774, an Inhibitor of Epidermal Growth Factor Receptor Tyrosine Kinase", Cancer Research 57, Nov. 1, 1997.
Schneider, M. et al., "The Epidermal Growth Factor Receptor and Its Ligands in Skin Biology and Pathology", The American Journal of Pathology vol. 173 No. 1, Jul. 2008.
Duchalet et al., "Olmsted syndrome with erythromelalgia caused by recessive transient receptor potential vanilloid 3 mutations", British Journal of Dermatology vol. 171, 2014.
Duchalet et al., "A New TRPV3 Missense Mutation in a Patient With Olmsted Syndrome and Erythromelalgia", JAMA Dermatology vol. 150 No. 3, Mar. 2014.
Kenner-Bell et al.; "Epidermal growth factor receptor inhibition with erlotinib for palmoplantar keratoderma"; Journal of the American Academy of Dermatology, vol. 63, No. 2, Aug. 1, 2010, pp. e58-e59.
Eytan, Ori, et al. "Olmsted syndrome caused by a homozygous recessive mutation in TRPV3." The Journal of investigative dermatology 134.6 (2014): 1752-1754.

* cited by examiner

EGFR INHIBITORS FOR TREATING KERATODERMAS

FIELD OF THE INVENTION

The present invention relates to use of EGFR inhibitors or inhibitors of the EGFR activating and signalling pathways for the keratodermas.

BACKGROUND OF THE INVENTION

"Keratoderma" is a term that means marked thickening of the skin. Keratoderma may be inherited (hereditary). In particular, Olmsted syndrome (OS) is a rare genodermatosis classically characterized by the combination of bilateral mutilating transgredient palmoplantar keratoderma (PPK) and periorificial keratotic plaques, but which shows considerable clinical heterogeneity. The disease starts usually at birth or in early childhood. OS is observed in both sexes, although male cases are more frequent. The most suggestive symptoms associate PPK with pseudoainhum and periorificial keratotic plaques. Frequently associated features include hair and nail abnormalities, leukokeratosis, corneal default and recurrent infections. Pain at the sites of hyperkeratosis and itching are variable but can be severe. Most of reported OS cases are sporadic, although familial cases with different mode of inheritance were also described.

Current treatments of hyperkeratosis (mainly emollients, keratolytics, retinoids or corticosteroids), either topical or systemic, are symptomatic and offer only temporary partial relief. Specific management of pain and itching is important to reduce the morbidity of the disease. The disease is debilitating and progressive keratoderma and auto-amputation of digits can prevent patients from grasping and walking, and confine them to a wheelchair. New therapeutic options are therefore crucial and are expected from a better understanding of the disease mechanisms.

Since 2012, gain of function mutations of TRPV3 (Transient receptor potential vanilloid-3) gene were reported as a cause of OS (Wilson, Neil J., et al. "*Expanding the phenotypic spectrum of Olmsted syndrome.*" *The Journal of investigative dermatology* 135.11 (2015): 2879). The relation between TRPV3 mutation and clinical symptoms was not established but in the work of Cheng et al (Cheng, Xiping, et al. "*TRP channel regulates EGFR signaling in hair morphogenesis and skin barrier formation.*" *Cell* 141.2 (2010): 331-343), it was demonstrated that TRPV3 signaling that operates as a Ca2+-permeable nonselective cation channel was mediated in mouse and human keratinocytes by EGFR transactivation and amplified by a positive feedback. The process of TRPV3 transactivation of EGFR involves the activation of the membrane protease ADAM17, also called TACE, which cleaves the membrane precursor of the EGFR ligand TGF-α, leading to EGFR activation. The hint for this discovery was the phenotype of non-conditional or keratinocyte targeted TRPV3 knockout mice that displayed a curled whiskers and perm hair phenotype similar to waved-1 and waved-2 mutants which was previously shown to result from hypomorphic mutations of TGF-α and EGFR (Schneider, Marion R., et al. "*Beyond wavy hairs: the epidermal growth factor receptor and its ligands in skin biology and pathology.*" *The American journal of pathology* 173.1 (2008): 14-24). The role of EGFR in skin biology is complex but phenotypes observed in EGFR and TGF-α transgenic mice indicate that it plays an important role in keratinocytes proliferation and differentiation and more generally in skin homeostasis (Schneider, Marion R., et al. "*Beyond wavy hairs: the epidermal growth factor receptor and its ligands in skin biology and pathology.*" *The American journal of pathology* 173.1 (2008): 14-24).

SUMMARY OF THE INVENTION

The present invention relates to use of EGFR inhibitors for the keratodermas. In particular, the present invention is defined by the claims.

DETAILED DESCRIPTION OF THE INVENTION

The first object of the present invention relates to a method of treating a keratoderma in a patient in need thereof comprising administering to the patient a therapeutically effective amount of an EGFR inhibitor.

As used herein, the term "keratoderma" has its general meaning in the art and is a term that means marked thickening of the skin. Classification of keratodermas depends on whether or not it is inherited, and its clinical features. Diffuse keratodermas affect most of the palms and soles. Focal keratodermas mainly affect pressure areas. Punctate-type keratodermas result in tiny bumps on the palms and soles. Most often the abnormal skin involves only the palms and soles (non-transgredient) but sometimes it extends on to the top of the hands and feet as well (transgredient).

In some embodiments, the keratoderma is a palmoplantar keratoderma. The term "palmoplantar keratoderma" or "PPK" indicates any form of persistent thickening of the epidermis of palms and soles and includes genetic as well as acquired conditions. PPKs represent a large, varied group of syndromes that are vastly different with respect to symptoms and clinical presentation. PPK may be acquired in inflammatory skin diseases such as eczema, psoriasis, and lichen planus, and has been reported as a paraneoplastic phenomenon. Genetically determined PPKs are a heterogeneous group of individually rare disorders inherited by a variety of mechanisms or occurring sporadically.

In some embodiments, congenital keratodermas include diffuse palmoplantar keratodermas (e.g. diffuse epidermolytic palmoplantar keratoderma, diffuse nonepidermolytic palmoplantar keratoderma, mal de meleda), focal palmoplantar keratoderma (e.g. striate palmoplantar keratoderma), punctate palmoplantar keratoderma (e.g. keratosis punctata palmaris et plantaris, spiny keratoderma, focal acral hyperkeratosis), diffuse palmoplantar keratoderma (e.g. Erythrokeratodermia variabilis, palmoplantar keratoderma of Sybert, Olmsted syndrome, and Naegeli-Franceschetti-Jadassohn syndrome), focal palmoplantar keratoderma (e.g. Papillon-Lefèvre syndrome, Pachyonychia congenita type I, Pachyonychia congenita type II, focal palmoplantar keratoderma with oral mucosal hyperkeratosis, and Camisa disease), ectodermal dysplasias (Clouston's hidrotic ectodermal dysplasia, Acrokeratotic poikiloderma, and Dermatopathic pigmentosa reticularis), syndromic keratodermas (e.g. Vohwinkel syndrome, Palmoplantar keratoderma associated with esophageal cancer, Palmoplantar keratoderma and spastic paraplegia, Naxos disease, Striate palmoplantar keratoderma, woolly hair, and left ventricular dilated cardiomyopathy, Keratitis-ichthyosis-deafness syndrome, Corneodermatosseous syndrome, Huriez syndrome, Oculocutaneous tyrosinemia, Cardiofaciocutaneous syndrome, and Schöpf-Schulz-Passarge syndrome).

In some embodiments, acquired keratodermas include aids-associated keratoderma, arsenical keratosis, calluses, climacteric keratoderma, clavi (corns), eczema, human papillomavirus, keratoderma blenorrhagicum, lichen planus, norwegian scabies, paraneoplastic keratoderma, psoriasis, reactive arthritis, secondary syphilis, tinea pedis, sézary syndrome, tuberculosis verrucosa cutis drug-induced keratoderma.

In some embodiments, the patient suffers from Olmsted syndrome. As used herein, the term "Olmsted syndrome" or "OS" has its general meaning in the art and refers to a hereditary palmoplantar keratoderma characterized by the combination of bilateral mutilating transgredient palmoplantar keratoderma and periorificial keratotic plaques. The term is also known as Mutilating palmoplantar keratoderma (PPK) with periorificial keratotic plaques. The disease starts usually at birth, in neonatal period or in early childhood, when the child starts to walk and grasp, and worsens over time. The disease has a slow but progressive course.

In some embodiments, the patient harbours a TRPV3 mutation. As used herein the term "TRPV3" has its general meaning in the art and refers to Transient receptor potential cation channel subfamily V member 3. The human amino acid sequence of TRPV3 is represented by SEQ ID NO:1.

>sp|Q8NET8|TRPV3_HUMAN Transient receptor potential
cation channel subfamily V member 3 OS = Homo
sapiens OX = 9606 GN = TRPV3 PE = 1 SV = 2
SEQ ID NO: 1
MKAHPKEMVPLMGKRVAAPSGNPAILPEKRPAEITPTKKSAHFFLEIEGFE

PNPTVAKTSPPVFSKPMDSNIRQCISGNCDDMDSPQSPQDDVTETPSNPNS

PSAQLAKEEQRRKKRRLKKRIFAAVSEGCVEELVELLVELQELCRRRHDED

VPDFLMHKLTASDTGKTCLMKALLNINPNTKEIVRILLAFAEENDILGRFI

NAEYTEEAYEGQTALNIAIERRQGDIAALLIAAGADVNAHAKGAFFNPKYQ

HEGFYFGETPLALAACTNQPEIVQLLMEHEQTDITSRDSRGNNILHALVTV

AEDFKTQNDFVKRMYDMILLRSGNWELETTRNNDGLTPLQLAAKMGKAEIL

KYILSREIKEKRLRSLSRKFTDWAYGPVSSSLYDLTNVDTTTDNSVLEITV

YNTNIDNRHEMLTLEPLHTLLHMKWKKFAKHMFFLSFCFYFFYNITLTLVS

YYRPREEEAIPHPLALTHKMGWLQLLGRMFVLIWAMCISVKEGIAIFLLRP

SDLQSILSDAWFHFVFFIQAVLVILSVFLYLFAYKEYLACLVLAMALGWAN

MLYYTRGFQSMGMYSVMIQKVILHDVLKFLFVYIVFLLGFGVALASLIEKC

PKDNKDCSSYGSFSDAVLELFKLTIGLGDLNIQQNSKYPILFLFLLITYVI

LTFVLLLNMLIALMGETVENVSKESERIWRLQRARTILEFEKMLPEWLRSR

FRMGELCKVAEDDFRLCLRINEVKWTEWKTHVSFLNEDPGPVRRTDFNKIQ

DSSRNNSKTTLNAFEEVEEFPETSV

TRPV3 mutations associated to OS are well known in the art and include missense mutations such as p.G568C, p.G573S, p.G573C, p.L673F, P.W692G, as well as recessive mutations such as p.Gln216_Gly262del. Mutations in TRPV3 gene may be identified by any suitable method in the art, but in certain embodiments the mutations are identified by one or more of polymerase chain reaction (PCR) or sequencing.

In some embodiments, the patient is under the age of 20 years old. In some embodiments, the patient is under the age of 18 years old. In some embodiments, the patient is under the age of 15 years old. In some embodiments, the patient is 5, 6, 7, 8, 9, 10, 11, 12, 13, 14, 15, 17 or 18 years old.

In some embodiments, the patient also suffers from erythromelalgia. As used herein, the term "erythromelalgia" has its general meaning in the art and refers to rare condition that primarily affects the feet and, less commonly, the hands (extremities). It is characterized by intense, burning pain of affected extremities, severe redness (erythema), and increased skin temperature that may be episodic or almost continuous in nature.

As used herein, the term "treatment" or "treat" refer to both prophylactic or preventive treatment as well as curative or disease modifying treatment, including treatment of patient at risk of contracting the disease or suspected to have contracted the disease as well as patients who are ill or have been diagnosed as suffering from a disease or medical condition, and includes suppression of clinical relapse. The treatment may be administered to a subject having a medical disorder or who ultimately may acquire the disorder, in order to prevent, cure, delay the onset of, reduce the severity of, or ameliorate one or more symptoms of a disorder or recurring disorder, or in order to prolong the survival of a subject beyond that expected in the absence of such treatment. By "therapeutic regimen" is meant the pattern of treatment of an illness, e.g., the pattern of dosing used during therapy. A therapeutic regimen may include an induction regimen and a maintenance regimen. The phrase "induction regimen" or "induction period" refers to a therapeutic regimen (or the portion of a therapeutic regimen) that is used for the initial treatment of a disease. The general goal of an induction regimen is to provide a high level of drug to a patient during the initial period of a treatment regimen. An induction regimen may employ (in part or in whole) a "loading regimen", which may include administering a greater dose of the drug than a physician would employ during a maintenance regimen, administering a drug more frequently than a physician would administer the drug during a maintenance regimen, or both. The phrase "maintenance regimen" or "maintenance period" refers to a therapeutic regimen (or the portion of a therapeutic regimen) that is used for the maintenance of a patient during treatment of an illness, e.g., to keep the patient in remission for long periods of time (months or years). A maintenance regimen may employ continuous therapy (e.g., administering a drug at a regular intervals, e.g., weekly, monthly, yearly, etc.) or intermittent therapy (e.g., interrupted treatment, intermittent treatment, treatment at relapse, or treatment upon achievement of a particular predetermined criteria [e.g., disease manifestation, etc.]).

In particular, the EGFR inhibitor is particularly suitable for alleviating pain, in particular, pain associated with areas of hyperkeratosis. The EGFR inhibitor is also suitable for inducing a complete disappearance of the hyperkeratosis as well as for treating anorexia and insomnia.

As used herein, the term "EGFR" has its general meaning in the art and is herein intended in accordance with its ordinary meaning in the field, i.e., as meaning Epidermal Growth Factor Receptor or ErbB-1 (HER1 in humans). It is a member of the ErbB family of receptors. Naturally-occurring EGFR is expressed on the cell surface and is activated by binding of specific ligands, including Epidermal Growth Factor (EGF) and Transforming Growth Factor α (TGFα). Upon activation by its growth factor ligand(s), EGFR undergoes a transition from an inactive monomeric form to an active homodimer. EGFR may also pair with other member(s) of the ErbB receptor family, such as ErbB2/Her2/neu, to create an activated heterodimer, and/or form clusters of activated EGFR forms.

As used herein, the term "EGFR inhibitor" refers to any EGFR inhibitor that is currently known in the art or that will be identified in the future, and includes any chemical entity that, upon administration to a patient, results in inhibition of a biological activity associated with activation of the EGFR in the patient, including any of the downstream biological effects otherwise resulting from the binding to EGFR of its natural ligand. Such EGFR inhibitor include any agent that can block EGFR activation or any of the downstream biological effects of EGFR activation. Such an inhibitor can act by binding directly to the intracellular domain of the receptor and inhibiting its kinase activity. Alternatively, such an inhibitor can act by occupying the ligand binding site or a portion thereof of the EGFR receptor, thereby making the receptor inaccessible to its natural ligand so that its normal biological activity is prevented or reduced. Alternatively, such an inhibitor can act by modulating the dimerization of EGFR polypeptides, or interaction of EGFR polypeptide with other proteins. EGFR inhibitors also include inhibitors of the EGFR activating and signalling pathways and particularly include ADAM17 and TGFα inhibitors since the proteins act as components of the EGFR (trans)activation pathway.

EFGR inhibitors are well known in the art and include, for example quinazoline EGFR inhibitors, pyrido-pyrimidine EGFR inhibitors, pyrimido-pyrimidine EGFR inhibitors, pyrrolo-pyrimidine EGFR inhibitors, pyrazolo-pyrimidine EGFR inhibitors, phenylamino-pyrimidine EGFR inhibitors, oxindole EGFR inhibitors, indolocarbazole EGFR inhibitors, phthalazine EGFR inhibitors, isoflavone EGFR inhibitors, quinalone EGFR inhibitors, and tyrphostin EGFR inhibitors, such as those described in the following patent publications, and all pharmaceutically acceptable salts and solvates of said EGFR inhibitors: International Patent Publication Nos. WO 96/33980, WO 96/30347, WO 97/30034, WO 97/30044, WO 97/38994, WO 97/49688, WO 98/02434, WO 97/38983, WO 95/19774, WO 95/19970, WO 97/13771, WO 98/02437, WO 98/02438, WO 97/32881, WO 98/33798, WO 97/32880, WO 97/3288, WO 97/02266, WO 97/27199, WO 98/07726, WO 97/34895, WO 96/31510, WO 98/14449, WO 98/14450, WO 98/14451, WO 95/09847, WO 97/19065, WO 98/17662, WO 99/35146, WO 99/35132, WO 99/07701, and WO 92/20642; European Patent Application Nos. EP 520722, EP 566226, EP 787772, EP 837063, and EP 682027; U.S. Pat. Nos. 5,747,498, 5,789,427, 5,650,415, and 5,656,643; and German Patent Application No. DE 19629652. Additional non-limiting examples of low molecular weight EGFR inhibitors include any of the EGFR inhibitors described in Traxler, P (1998) and those described in Al-Obeidi F A et al. (2000).

In some embodiments, the EGFR inhibitor according to the invention is selected from the group consisting of brigatinib, erlotinib, gefitinib, icotinib, lapatinib, sapitinib, vandetanib, varlitinib afatinib, canertinib, dacomitinib, neratinib, osimertinib, pelitinib, and rociletinib.

In some embodiments, the EGFR inhibitor of the present invention is erlotinib (6,7-bis(2-methoxyethoxy)-4-quinazolin-4-yl]-(3-ethynylphenyl)amine) (U.S. Pat. No. 5,747,498; International Patent Publication No. WO 01/34574, and Moyer J D. et al. (1997)). Erlotinib has the structure of the formula:

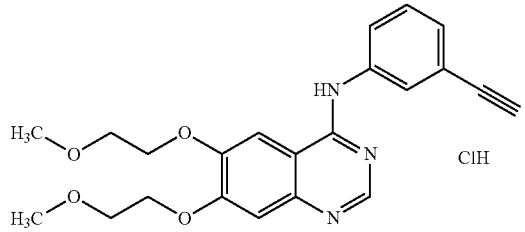 [SMILES: C#Cc1cccc(Nc2ncnc3cc(OCCOC)c(OCCOC)cc23)c1 ; Cl]

In some embodiments, the EGFR inhibitor of the present invention is gefitinib (also known as ZD1839 or IRESSA®; Astrazeneca) (Woodburn et al., 1997, Proc. Am. Assoc. Cancer Res. 38:633). The compound is disclosed in International Patent Application WO 96/33980 (Example 1) has the structure of the formula:

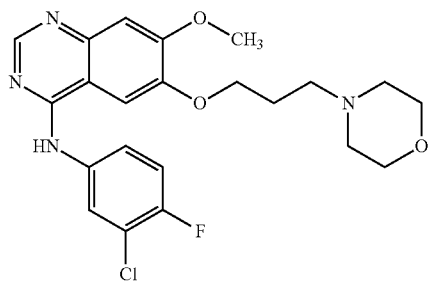 [SMILES: COc1cc2ncnc(Nc3ccc(F)c(Cl)c3)c2cc1OCCCN1CCOCC1]

In another embodiment the EGFR inhibitor may consist in an antibody or antibody fragment that can partially or completely block EGFR activation by HB-EGF. Non-limiting examples of antibody-based EGFR inhibitors include those described in Modjtahedi, H., et al., 1993, Br. J. Cancer 67:247-253; Teramoto, T., et al., 1996, Cancer 77:639-645; Goldstein et al., 1995, Clin. Cancer Res. 1:1311-1318; Huang, S. M., et al., 1999, Cancer Res. 15:59(8):1935-40; and Yang, X., et al., 1999, Cancer Res. 59:1236-1243. Thus, the EGFR inhibitor can be the monoclonal antibody Mab E7.6.3 (Yang, X. D. et al. (1999)), or Mab C225 (ATCC Accession No. HB-8508, U.S. Pat. No. 4,943,533), or an antibody or antibody fragment having the binding specificity thereof. Suitable monoclonal antibody EGFR inhibitors include, but are not limited to, IMC-C225 (also known as cetuximab or ERBITUX™; Imclone Systems), ABX-EGF (Abgenix), EMD 72000 (Merck KgaA, Darmstadt), RH3 (York Medical Bioscience Inc.), and MDX-447 (Medarex/Merck KgaA).

As used herein, the term "ADAM17" or "TACE" has its general meaning in the art and refers to a protein having an amino acid sequence substantially identical to any of the representative TACE sequences of GenBank Accession Nos. NP_003174.3 (human), NP_033745.4 (mouse) and NP_064702.1 (rat). Suitable cDNA encoding TACE are provided at GenBank Accession Nos. NM_003183.4 (human), NM_009615.5 (mouse) and NM_020306.1 (rat). ADAM17 inhibitors are well known in the art and typically include compounds described in WO2012005229, WO 0012467, WO 0012478, WO 0035885, WO 0044709, WO 0044710, WO 0044711, WO 0044713, WO 0044716, WO 0044723, WO 0044730, WO 0044740, WO 0044749, WO 0046189, WO 0046221, WO 0056704, WO 0059285, WO 0069812, WO 0069819, WO 0069821, WO 0069822, WO 0069827, WO 0069839, WO 0071514, WO 0075108, WO 0112592, WO 0122952, WO 0130360, WO 0144189, WO 0155112, WO 0160820, WO 0162733, WO 0162742, WO 0162750, WO 0162751, WO 0170673, WO 0170734, WO 0185680, WO 0187870, WO 0187883, WO 0204416, WO 0206215, WO 9005719, WO 9402447, WO 9504715, WO 9506031, WO 9633166, WO 9633167, WO 9633968, WO 9702239, WO 9718188, WO 9718207, WO 9719050, WO 9719053, WO 9720824, WO 9724117, WO 9742168, WO 9743249, WO 9743250, WO 9749674, WO 9807742, WO 9816503, WO 9816506, WO 9816514, WO 9816520, WO 9830541, WO 9830551, WO 9832748, WO 9837877, WO 9838163, WO 9838179, WO 9839326, WO 9843963, WO 9851665, WO 9855449, WO 9902510, WO 9903878, WO 9906410, WO 9918076, WO 9931052, WO 9937625, WO 9910080, WO 9942436, WO 9958531, and WO 9961412

In some embodiments, the ADAM17 inhibitor is selected from the group consisting of W-3646, Ro-32-7315, GW-3333, apratastat or (3S)—N-hydroxy-4[[4[(4-hydroxybut-2-ynyl)oxy]phenyl]sulfonyl]-2,2-dimethylthiomorpholine-3-carboxamide, GW-4459, CGS-33090A, DPC-333, TNF-484, WTACE2, SP-057, SL-422, FYK-1388 and KB-R7785. The following ADAM17 inhibitors are also advantageous: 3-[3-[N-isopropyl-N-(4-methoxyphenylsulfonyl)amino]phenyl]-3-(3-pyridyl)-2(E)-propenohydroxamic acid, (2R,3S)-3-(formylhydroxyamino)-4-methyl-2-(2-methylpropyl)-N-[(1S,2S)-2-methyl-1-[(2-pyridinylamino)carbonyl]butyl]pentanamide, (2R,3S)-3-(formylhydroxyamino)-N-[(1S)-4-[[imino(nitroamino) methyl]amino]-1-[(2-thiazolylamino)carbonyl]butyl]-2-(2-methylpropyl)hexanamide, (αR,1α,4β)-α-[[(4-ethoxyphenyl)sulfonyl](4-pyridinylmethyl)amino]-N-hydroxy-4-propoxycyclohexaneacetamide and (αR)—N-hydroxy-α,3-dimethyl-2-oxo-3-[4-(2-methyl-4-quinolinylmethoxy)phenyl]-1-pyrrolidineacetamide. Another example includes BMS566394.

By a "therapeutically effective amount" is meant a sufficient amount of the EGFR inhibitor to treat Olmsted syndrome at a reasonable benefit/risk ratio applicable to any medical treatment. It will be understood that the total daily usage of the compounds and compositions of the present invention will be decided by the attending physician within the scope of sound medical judgment. The specific therapeutically effective dose level for any particular subject will depend upon a variety of factors including the disorder being treated and the severity of the disorder; activity of the specific compound employed; the specific composition employed, the age, body weight, general health, sex and diet of the subject; the time of administration, route of administration, and rate of excretion of the specific compound employed; the duration of the treatment; drugs used in combination or coincidental with the specific polypeptide employed; and like factors well known in the medical arts. For example, it is well within the skill of the art to start doses of the compound at levels lower than those required to achieve the desired therapeutic effect and to gradually increase the dosage until the desired effect is achieved. However, the daily dosage of the products may be varied over a wide range from 0.01 to 1,000 mg per adult per day. Typically, the compositions contain 0.01, 0.05, 0.1, 0.5, 1.0, 2.5, 5.0, 10.0, 15.0, 25.0, 50.0, 100, 250 and 500 mg of the agent for the symptomatic adjustment of the dosage to the subject to be treated. A medicament typically contains from about 0.01 mg to about 500 mg of the agent, preferably from 1 mg to about 100 mg of the agent. An effective amount of the drug is ordinarily supplied at a dosage level from 0.0002 mg/kg to about 20 mg/kg of body weight per day, especially from about 0.001 mg/kg to 7 mg/kg of body weight per day.

Typically the EGFR inhibitor of the present invention is combined with pharmaceutically acceptable excipients, and optionally sustained-release matrices, such as biodegradable polymers, to form pharmaceutical compositions. The term "Pharmaceutically" or "pharmaceutically acceptable" refers to molecular entities and compositions that do not produce an adverse, allergic or other untoward reaction when administered to a mammal, especially a human, as appropriate. A pharmaceutically acceptable carrier or excipient refers to a non-toxic solid, semi-solid or liquid filler, diluent, encapsulating material or formulation auxiliary of any type. The carrier can also be a solvent or dispersion medium containing, for example, water, ethanol, polyol (for example, glycerol, propylene glycol, and liquid polyethylene glycol, and the like), suitable mixtures thereof, and vegetables oils.

In some embodiments, it may be desirable to administer the EGFR inhibitor of the present invention in a topical formulation. As used herein the term "topical formulation" refers to a formulation that may be applied to skin. Topical formulations can be used for both topical and transdermal administration of substances. As used herein, "topical administration" is used in its conventional sense to mean delivery of a substance, such as a therapeutically active agent, to the skin or a localized region of a subject's body. As used herein, "transdermal administration" refers to administration through the skin. Transdermal administration is often applied where systemic delivery of an active is desired, although it may also be useful for delivering an active to tissues underlying the skin with minimal systemic absorption. Typically, the topical pharmaceutically acceptable carrier is any substantially nontoxic carrier conventionally usable for topical administration of pharmaceuticals in which the EGFR inhibitor of the present invention will remain stable and bioavailable when applied directly to skin surfaces. For example, carriers such as those known in the art effective for penetrating the keratin layer of the skin into the stratum corneum may be useful in delivering the EGFR inhibitor of the present invention to the area of interest. Such carriers include liposomes. EGFR inhibitor of the present invention can be dispersed or emulsified in a medium in a conventional manner to form a liquid preparation or mixed with a semi-solid (gel) or solid carrier to form a paste, powder, ointment, cream, lotion or the like. Suitable topical pharmaceutically acceptable carriers include water, buffered saline, petroleum jelly (vaseline), petrolatum, mineral oil, vegetable oil, animal oil, organic and inorganic waxes, such as microcrystalline, paraffin and ozocerite wax, natural polymers, such as xanthanes, gelatin, cellulose, collagen, starch, or gum arabic, synthetic polymers, alcohols, polyols, and the like. The carrier can be a water miscible carrier composition. Such water miscible, topical pharmaceutically acceptable carrier composition can include those made with one or more appropriate ingredients outset of therapy. The topical acceptable carrier will be any substantially non-toxic carrier conventionally usable for topical administration in which EGFR inhibitor of the present invention will remain stable and bioavailable when applied directly to the skin surface. Suitable cosmetically acceptable carriers are known to those of skill in the art and include, but are not limited to, cosmetically acceptable liquids, creams, oils, lotions, ointments, gels, or solids, such as conventional cosmetic night creams, foundation creams, suntan lotions, sunscreens, hand lotions, make-up and make-up bases, masks and the like. Any suitable carrier or vehicle effective for topical administration to a patient as known in the art may be used, such as, for example, a cream base, creams, liniments, gels, lotions, ointments, foams, solutions, suspensions, emulsions, pastes, aqueous mixtures, sprays, aerosolized mixtures, oils such as Crisco®, soft-soap, as well as any other preparation that is pharmaceutically suitable for topical administration on human and/or animal body surfaces such as skin or mucous membranes. Topical acceptable carriers may be similar or identical in nature to the above described topical pharmaceutically acceptable carriers. It may be desirable to have a delivery system that controls the release of EGFR inhibitor of the present invention to the skin and adheres to or maintains itself on the skin for an extended period of time to increase the contact time of the EGFR inhibitor of the present invention on the skin. Sustained or delayed release of EGFR inhibitor of the present invention provides a more efficient administration resulting in less frequent and/or decreased dosage of EGFR inhibitor of the present invention and better patient compliance. Examples of suitable carriers for sustained or delayed release in a moist environment include gelatin, gum arabic, xanthane polymers. Pharmaceutical carriers capable of releasing the EGFR inhibitor of the present invention when exposed to any oily, fatty, waxy, or moist environment on the area being treated, include thermoplastic or flexible thermoset resin or elastomer including thermoplastic resins such as polyvinyl halides, polyvinyl esters, polyvinylidene halides and halogenated polyolefins, elastomers such as brasiliensis, polydienes, and halogenated natural and synthetic rubbers, and flexible thermoset resins such as polyurethanes, epoxy resins and the like.

Controlled delivery systems are described, for example, in U.S. Pat. No. 5,427,778 which provides gel formulations and viscous solutions for delivery of the EGFR inhibitor of the present invention to a skin site. Gels have the advantages of having a high water content to keep the skin moist, the ability to absorb skin exudate, easy application and easy removal by washing.

Preferably, the sustained or delayed release carrier is a gel, liposome, microsponge or microsphere. The EGFR inhibitor of the present invention can also be administered in combination with other pharmaceutically effective agents including, but not limited to, antibiotics, other skin healing agents, and antioxidants. In some embodiments, the topical formulation of the present invention comprises a penetration enhancer. As used herein, "penetration enhancer" refers to an agent that improves the transport of molecules such as an active agent (e.g., a drug) into or through the skin. Various conditions may occur at different sites in the body either in the skin or below creating a need to target delivery of compounds. Thus, a "penetration enhancer" may be used to assist in the delivery of an active agent directly to the skin or underlying tissue or indirectly to the site of the disease or a symptom thereof through systemic distribution. A penetration enhancer may be a pure substance or may comprise a mixture of different chemical entities.

The invention will be further illustrated by the following FIGURES and examples. However, these examples and FIGURES should not be interpreted in any way as limiting the scope of the present invention.

EXAMPLE

Olmsted (OS) syndrome is a heterogeneous genodermatosis characterized principally by palmoplantar keratoderma (PPK) associated with additional features like severe pain at the sites of hyperkeratosis. Since 2012, gain of function mutations of TRPV3 (Transient receptor potential vanilloid-3) gene were reported as a cause of OS (Wilson, Neil J., et al. "*Expanding the phenotypic spectrum of Olmsted syndrome.*" The Journal of investigative dermatology 135.11 (2015): 2879). The relation between TRPV3 mutation and clinical symptoms was not established but in the work of Cheng et al (Cheng, Xiping, et al. "*TRP channel regulates EGFR signaling in hair morphogenesis and skin barrier formation.*" Cell 141.2 (2010): 331-343), it was demonstrated that TRPV3 signaling that operates as a Ca2+-permeable nonselective cation channel was mediated in mouse and human keratinocytes by EGFR transactivation and amplified by a positive feedback. The hint for this discovery was the phenotype of non-conditional or keratinocyte targeted TRPV3 knockout mice that displayed a curled whiskers and perm hair phenotype similar to waved-1 and waved-2 mutants which was previously shown to result from hypomorphic mutations of TGF-α and EGFR (Schneider, Marion R., et al. "*Beyond wavy hairs: the epidermal growth factor receptor and its ligands in skin biology and pathology.*" The American journal of pathology 173.1 (2008): 14-24). The role of EGFR in skin biology is complex but phenotypes observed in EGFR and TGF-α transgenic mice indicate that it plays an important role in keratinocytes proliferation and differentiation and more generally in skin homeostasis (Schneider, Marlon R., et al. "*Beyond wavy hairs: the epidermal growth factor receptor and its ligands in skin biology and pathology.*" The American journal of pathology 173.1 (2008): 14-24). Indeed pathological examination of skin biopsies of OS patients showed amplification of all epidermis cell compartments and extended expression of EGFR with a thick stratum corneum in agreement with the stimulatory role of EGFR on transglutaminase activity of suprabasal cells. This led us to propose the use of the EGFR inhibitor Erlotinib, with the aim of breaking the vicious circle initiated by constitutive activation of TRPV3, for the treatment of 3 OS patients whose clinical symptoms and TRPV3 mutations were previously reported.

Patients 1 and 2 are two affected brothers aged 18 and 15 with p.Gly568Cys and p.Gln216_Gly262del recessive mutations (Duchatelet, Sabine, et al. "*Olmsted syndrome with erythromelalgia caused by recessive transient receptor potential vanilloid 3 mutations.*" British Journal of Dermatology 171.3 (2014): 675-678) and patient 3 (Duchatelet, Sabine, et al. "*A new TRPV3 missense mutation in a patient with Olmsted syndrome and erythromelalgia.*" JAMA dermatology 150.3 (2014): 303-306) is a 14 year old girl with a dominant heterozygous missense mutation p.Leu673Phe. Patients 1 and 3 had severe asymmetrical PPK (only plantar for patient 1) with erythromelalgia symptoms that were resistant to pain killers and used cooling methods to reduce the symptoms such as applying ice, soaking their feet in cold water for prolonged periods resulting in immersion injury with ulceration and infection due to cutaneous maceration. The association of cutaneous symptoms with progressive foot deformities confined them to wheelchair since the age of 3. Patient 2 had mild PPK with less severe eythromelalgia.

According to weight and size Erlotinib was started at 100 mg for patients 1 and 2 and at 50 mg for patient 3. It was immediately reduced to 50 mg for patient 2 because of abdominal pain and nausea. Dosages were adjusted at days 30 and 60 in relation to plasma levels, tolerance and efficiency. A rapid reduction of pain was observed within days for patients 1 and 2 and later for patient 3 with total disappearance and spontaneous pain drug removal after three months. Keratoderma disappeared progressively and regression was completed at day 30 for patient 2 and day 90 for patients 1 and 3. Pain relief associated with areas of hyperkeratosis suggests that mediators secreted by abnormal keratinocytes may trigger nociceptive neuronal receptors located in the skin but their nature remains to be identified. The only persistent side effect of Erlotinib was a moderate acne reaction in patient 1.

It is anticipated that patients will have to be maintained continuously on Erlotinib treatment but at the lowest dose that keeps them in remission because long term effects particularly in children's development are unfamiliar. Resistance to treatment as observed in oncology is not expected to occur in these patients since the biological properties of abnormal keratinocytes are different from those of malignant cells which usually result from an accumulation of mutations that endow the cells with invasive growth properties and defects of DNA repair and apoptosis.

In conclusion, the dramatic improvement of 3 patients shows that Erlotinib is the first efficient treatment of OS and confirms the hypothesis that EGFR signaling is the principal mediator of symptoms resulting from gain of function TRPV3 mutations.

REFERENCES

Throughout this application, various references describe the state of the art to which this invention pertains. The disclosures of these references are hereby incorporated by reference into the present disclosure.

---

The invention claimed is:

1. A method of treating Olmsted syndrome in a patient in need thereof comprising administering to the patient a therapeutically effective amount of an epithelial growth factor receptor (EGFR) inhibitor, wherein said patient harbors at least one transient receptor potential vanilloid-3 (TRPV3) mutation, and wherein said patient also suffers from erythromelalgia.

2. The method of claim 1 wherein the patient is under the age of 20 years old.

3. The method of claim 1 wherein the patient is under the age of 18 years old.

4. The method of claim 1 wherein the patient is under the age of 15 years old.

5. The method of claim 1 wherein the EGFR inhibitor is selected from the group consisting of brigatinib, erlotinib, gefitinib, icotinib, lapatinib, sapitinib, vandetanib, varlitinib afatinib, canertinib, dacomitinib, neratinib, osimertinib, pelitinib, and rociletinib.

6. The method of claim 1 wherein the EGFR inhibitor is erlotinib.

7. The method of claim 1 wherein the EGFR inhibitor is an inhibitor of the EGFR activating and signalling pathways.

8. The method of claim 7 wherein the inhibitor of the EGFR activating and signalling pathways is an ADAM17 inhibitor or a transforming growth factor (TGF) alpha inhibitor.

9. The method of claim 1 wherein the EGFR inhibitor is administered to the patient in a topical formulation.

10. The method of claim 1, wherein the TRPV3 mutation is p.G568C, p.G573S, p.G573C, p.L673F, p.W692G, or p.Gln216_Gly262del.

11. The method of claim 1, wherein 1-100 mg of the EGFR inhibitor is administered to the patient.

* * * * *

SEQUENCE LISTING

```
<160> NUMBER OF SEQ ID NOS: 1

<210> SEQ ID NO 1
<211> LENGTH: 790
<212> TYPE: PRT
<213> ORGANISM: Homo sapiens

<400> SEQUENCE: 1

Met Lys Ala His Pro Lys Glu Met Val Pro Leu Met Gly Lys Arg Val
1               5                   10                  15

Ala Ala Pro Ser Gly Asn Pro Ala Ile Leu Pro Glu Lys Arg Pro Ala
                20                  25                  30

Glu Ile Thr Pro Thr Lys Lys Ser Ala His Phe Phe Leu Glu Ile Glu
            35                  40                  45

Gly Phe Glu Pro Asn Pro Thr Val Ala Lys Thr Ser Pro Pro Val Phe
        50                  55                  60

Ser Lys Pro Met Asp Ser Asn Ile Arg Gln Cys Ile Ser Gly Asn Cys
65                  70                  75                  80

Asp Asp Met Asp Ser Pro Gln Ser Pro Gln Asp Val Thr Glu Thr
                85                  90                  95

Pro Ser Asn Pro Asn Ser Pro Ser Ala Gln Leu Ala Lys Glu Glu Gln
                100                 105                 110

Arg Arg Lys Lys Arg Arg Leu Lys Lys Arg Ile Phe Ala Ala Val Ser
            115                 120                 125

Glu Gly Cys Val Glu Glu Leu Val Glu Leu Leu Val Glu Leu Gln Glu
        130                 135                 140

Leu Cys Arg Arg Arg His Asp Glu Asp Val Pro Asp Phe Leu Met His
145                 150                 155                 160

Lys Leu Thr Ala Ser Asp Thr Gly Lys Thr Cys Leu Met Lys Ala Leu
                165                 170                 175

Leu Asn Ile Asn Pro Asn Thr Lys Glu Ile Val Arg Ile Leu Leu Ala
            180                 185                 190

Phe Ala Glu Glu Asn Asp Ile Leu Gly Arg Phe Ile Asn Ala Glu Tyr
        195                 200                 205

Thr Glu Glu Ala Tyr Glu Gly Gln Thr Ala Leu Asn Ile Ala Ile Glu
    210                 215                 220

Arg Arg Gln Gly Asp Ile Ala Ala Leu Leu Ile Ala Ala Gly Ala Asp
225                 230                 235                 240

Val Asn Ala His Ala Lys Gly Ala Phe Phe Asn Pro Lys Tyr Gln His
                245                 250                 255

Glu Gly Phe Tyr Phe Gly Glu Thr Pro Leu Ala Leu Ala Ala Cys Thr
            260                 265                 270
```

-continued

```
Asn Gln Pro Glu Ile Val Gln Leu Met Glu His Gln Thr Asp
            275                 280             285
Ile Thr Ser Arg Asp Ser Arg Gly Asn Asn Ile Leu His Ala Leu Val
    290                 295                 300
Thr Val Ala Glu Asp Phe Lys Thr Gln Asn Asp Phe Val Lys Arg Met
305                 310                 315                 320
Tyr Asp Met Ile Leu Leu Arg Ser Gly Asn Trp Glu Leu Glu Thr Thr
                325                 330                 335
Arg Asn Asn Asp Gly Leu Thr Pro Leu Gln Leu Ala Ala Lys Met Gly
            340                 345                 350
Lys Ala Glu Ile Leu Lys Tyr Ile Leu Ser Arg Glu Ile Lys Glu Lys
            355                 360                 365
Arg Leu Arg Ser Leu Ser Arg Lys Phe Thr Asp Trp Ala Tyr Gly Pro
    370                 375                 380
Val Ser Ser Ser Leu Tyr Asp Leu Thr Asn Val Asp Thr Thr Thr Asp
385                 390                 395                 400
Asn Ser Val Leu Glu Ile Thr Val Tyr Asn Thr Asn Ile Asp Asn Arg
                405                 410                 415
His Glu Met Leu Thr Leu Glu Pro Leu His Thr Leu Leu His Met Lys
            420                 425                 430
Trp Lys Lys Phe Ala Lys His Met Phe Phe Leu Ser Phe Cys Phe Tyr
    435                 440                 445
Phe Phe Tyr Asn Ile Thr Leu Thr Leu Val Ser Tyr Tyr Arg Pro Arg
    450                 455                 460
Glu Glu Glu Ala Ile Pro His Pro Leu Ala Leu Thr His Lys Met Gly
465                 470                 475                 480
Trp Leu Gln Leu Leu Gly Arg Met Phe Val Leu Ile Trp Ala Met Cys
                485                 490                 495
Ile Ser Val Lys Glu Gly Ile Ala Ile Phe Leu Leu Arg Pro Ser Asp
                500                 505                 510
Leu Gln Ser Ile Leu Ser Asp Ala Trp Phe His Phe Val Phe Phe Ile
            515                 520                 525
Gln Ala Val Leu Val Ile Leu Ser Val Phe Leu Tyr Leu Phe Ala Tyr
    530                 535                 540
Lys Glu Tyr Leu Ala Cys Leu Val Leu Ala Met Ala Leu Gly Trp Ala
545                 550                 555                 560
Asn Met Leu Tyr Tyr Thr Arg Gly Phe Gln Ser Met Gly Met Tyr Ser
                565                 570                 575
Val Met Ile Gln Lys Val Ile Leu His Asp Val Leu Lys Phe Leu Phe
            580                 585                 590
Val Tyr Ile Val Phe Leu Leu Gly Phe Gly Val Ala Leu Ala Ser Leu
            595                 600                 605
Ile Glu Lys Cys Pro Lys Asp Asn Lys Asp Cys Ser Ser Tyr Gly Ser
            610                 615                 620
Phe Ser Asp Ala Val Leu Glu Leu Phe Lys Leu Thr Ile Gly Leu Gly
625                 630                 635                 640
Asp Leu Asn Ile Gln Gln Asn Ser Lys Tyr Pro Ile Leu Phe Leu Phe
                645                 650                 655
Leu Leu Ile Thr Tyr Val Ile Leu Thr Phe Val Leu Leu Leu Asn Met
                660                 665                 670
Leu Ile Ala Leu Met Gly Glu Thr Val Glu Asn Val Ser Lys Glu Ser
            675                 680                 685
Glu Arg Ile Trp Arg Leu Gln Arg Ala Arg Thr Ile Leu Glu Phe Glu
```

```
                690                 695                 700
Lys Met Leu Pro Glu Trp Leu Arg Ser Arg Phe Arg Met Gly Glu Leu
705                 710                 715                 720

Cys Lys Val Ala Glu Asp Asp Phe Arg Leu Cys Leu Arg Ile Asn Glu
                725                 730                 735

Val Lys Trp Thr Glu Trp Lys Thr His Val Ser Phe Leu Asn Glu Asp
                740                 745                 750

Pro Gly Pro Val Arg Arg Thr Asp Phe Asn Lys Ile Gln Asp Ser Ser
            755                 760                 765

Arg Asn Asn Ser Lys Thr Thr Leu Asn Ala Phe Glu Glu Val Glu Glu
        770                 775                 780

Phe Pro Glu Thr Ser Val
785             790
```